United States Patent
Muller, III et al.

(10) Patent No.: US 10,178,456 B2
(45) Date of Patent: Jan. 8, 2019

(54) ZIPPER SYSTEM INCORPORATING A SOUND PRODUCING SYSTEM

(71) Applicant: Zyphony, LLC, Alexandria, VA (US)

(72) Inventors: Alfred S. Muller, III, Alexandria, VA (US); Christopher B. McClelland, Brrookfield, CT (US); Kevin Joseph Corley, Richfield, CT (US)

(73) Assignee: ZYPHONY, LLC, Alexandria, VA (US)

( * ) Notice: Subject to any disclaimer, the term of this patent is extended or adjusted under 35 U.S.C. 154(b) by 0 days.

(21) Appl. No.: 15/586,584

(22) Filed: May 4, 2017

(65) Prior Publication Data
US 2018/0324509 A1    Nov. 8, 2018

(51) Int. Cl.
| | | |
|---|---|---|
| *H04R 1/02* | (2006.01) | |
| *H04R 3/00* | (2006.01) | |
| *G06F 3/16* | (2006.01) | |
| *G08B 21/18* | (2006.01) | |
| *A44B 19/08* | (2006.01) | |
| *A44B 19/24* | (2006.01) | |
| *H04W 4/14* | (2009.01) | |
| *H04W 4/80* | (2018.01) | |

(52) U.S. Cl.
CPC ............. *H04R 1/028* (2013.01); *A44B 19/08* (2013.01); *A44B 19/24* (2013.01); *G06F 3/165* (2013.01); *G08B 21/18* (2013.01); *H04R 3/00* (2013.01); *H04R 2420/07* (2013.01); *H04W 4/14* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 3,753,201 | A * | 8/1973 | Ohman | H01C 10/08 338/120 |
| 4,755,802 | A * | 7/1988 | Urbanczyk | A45C 13/24 116/84 |
| 2006/0164280 | A1* | 7/2006 | Nehls | G08C 17/02 341/176 |
| 2014/0098206 | A1* | 4/2014 | Rosella | H04R 1/028 348/61 |

FOREIGN PATENT DOCUMENTS

CN      104082941 A  * 10/2014

OTHER PUBLICATIONS

Rijckaert, Henk. "The Zippaphone." Instructables, Dec. 13, 2016, www.instructables.com/id/The-Zippaphone/.*
CN104082941A English translation.*

* cited by examiner

*Primary Examiner* — James Mooney
(74) *Attorney, Agent, or Firm* — Key IP Law Group, PLLC (57) ABSTRACT

A zipper system includes a zipper mechanism having interlocking teeth, the teeth, when interlocked, closing a signal circuit to an audio playback circuit, the audio playback circuit. The audio playback circuit includes a microprocessor. The microprocessor includes an audio track storage and control instructions that, when executed by the microprocessor, cause playback of an audio track from the audio track storage. The audio playback circuit further includes a speaker device coupled to the microprocessor that broadcasts the audio track.

25 Claims, 13 Drawing Sheets

ZIPPER SYSTEM INCORPORATING A SOUND PRODUCING SYSTEM

BACKGROUND

Zippers are well-known mechanisms for closing various articles including clothing, hand bags, luggage, sporting and camping gear, and many other articles. The major structure of a typical zipper consists of two rows of protruding teeth, which may be made to interdigitate, linking the rows. Each row may carry from tens to hundreds of specially shaped metal or plastic teeth. These teeth can be either individual or shaped from a continuous coil, and are also referred to as elements. A hand-operated slider moves along the rows of teeth. Inside the slider, a Y-shaped channel meshes together or separates the opposing rows of teeth, depending on the slider's direction of movement. The word zipper is onomatopoetic, because it was named for the sound the device makes when used, a high-pitched zip.

Figure 1A:
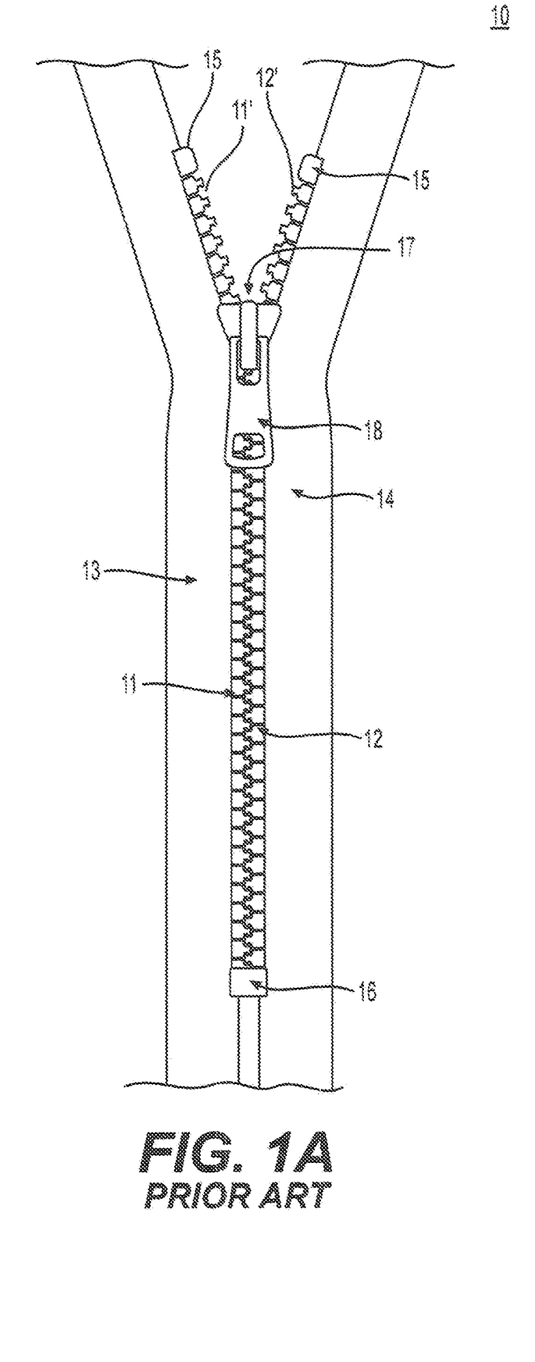
FIGS. 1A-1E illustrate prior art zippers and their various components.
Figure 1B:
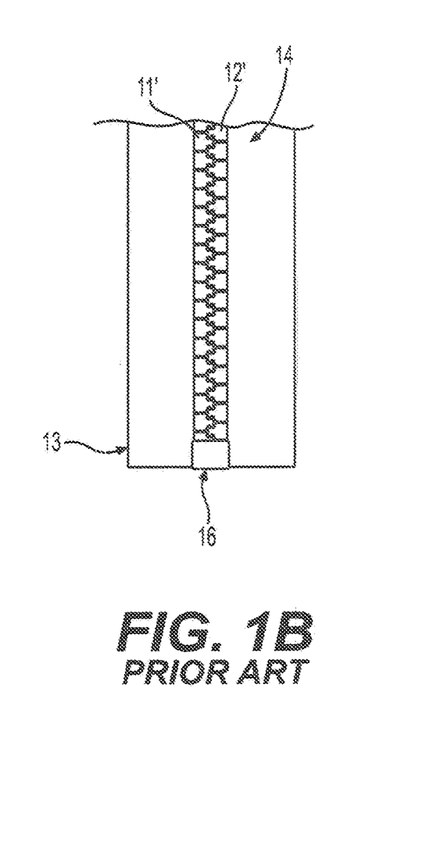
Figure 1C:
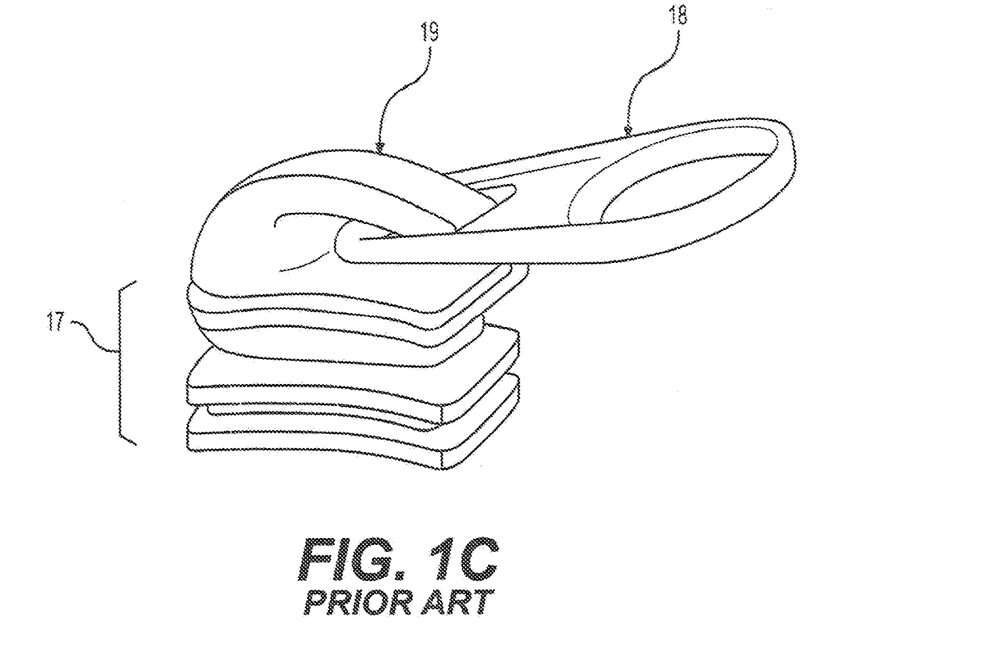
Figure 1D:
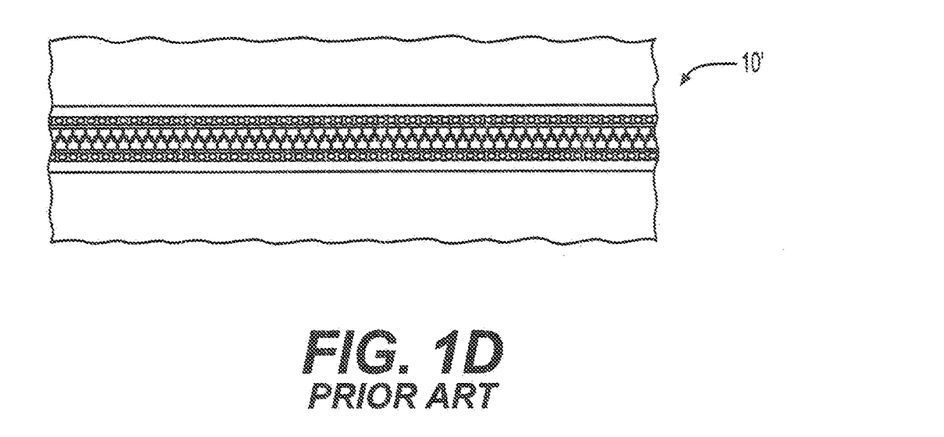
Figure 1E:
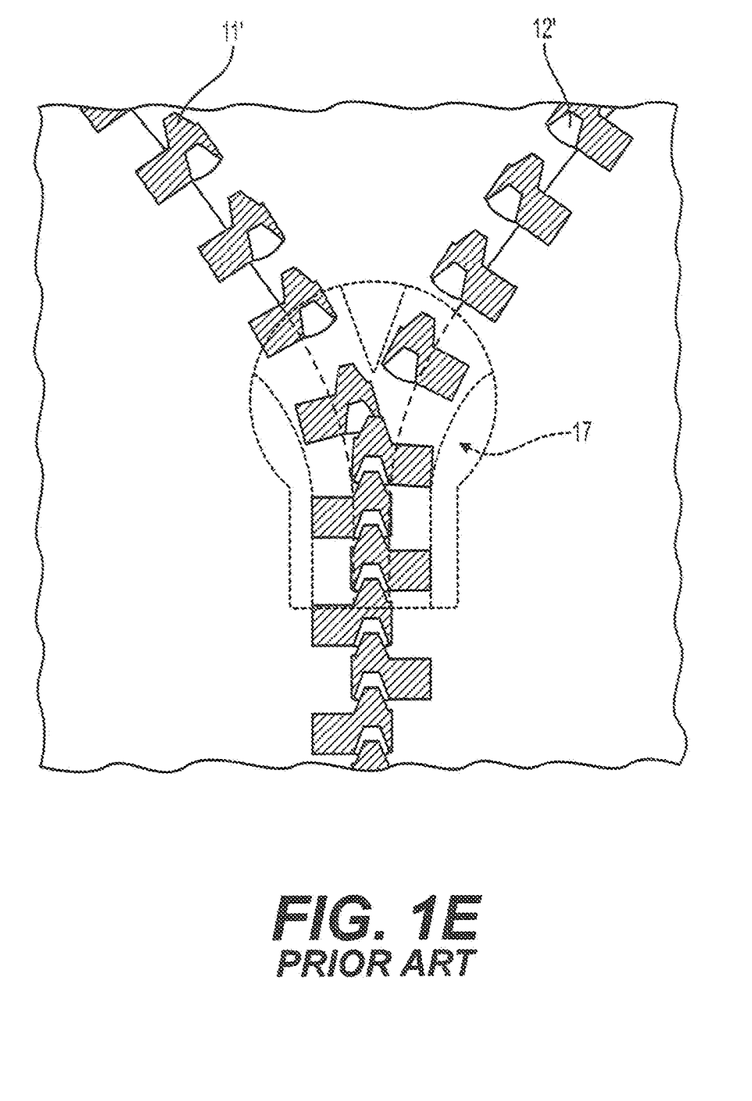

FIGS. 1A-1E illustrate prior art zippers and their various components. FIG. 1A shows zipper 10, which includes two rows 11 and 12 of interlocking teeth 11' and 12', respectively. The rows 11 and 12 are attached or held in place on tape 13 and 14, respectively. The teeth terminate in top stops 15 and bottom stops 16. Slider body 17, to which is hingeably-affixed pull tab 18 is used mesh together or separate the rows 11 and 12 of teeth. The pull tab 18 is held in place by crown 19, which is affixed to the slider 17. The tape 13 and 14 are attached, for example by sewing, to an opening in an article. FIG. 1B illustrates how the teeth 11' and 12' of the zipper 10 mesh and separate during operation of the slider body 17. FIG. 1C presents an oblique view of the slider body 17. FIG. 1D illustrates an alternate zipper 10', which a molded tooth version of the zipper of FIG. 1A. FIG. 1E shows operation of the slider body 17.

SUMMARY

A zipper system includes a zipper mechanism having interlocking teeth, the teeth, when interlocked, closing a signal circuit to an audio playback circuit, the audio playback circuit. The audio playback circuit includes a microprocessor. The microprocessor includes an audio track storage and control instructions that, when executed by the microprocessor, cause playback of an audio track from the audio track storage. The audio playback circuit further includes a speaker device coupled to the microprocessor that broadcasts the audio track.

A zipper system incorporating a sound producing system comprises a zipper body, comprising a first tape, comprising first interlocking teeth; and a first flexible wire in electrical contact with two or more of the first teeth, the first flexible wire having disposed at a top end, a first electrical connection, a second tape, comprising second interlocking teeth; and a plurality of second flexible wires, at least one of the plurality of second flexible wires in electrical contact with at least one of the second interlocking teeth, and a zipper pull in contact with the first and second interlocking teeth, wherein a first operation of the zipper pull meshes the first and second interlocking teeth and a second operation of the zipper pull separates the first and second interlocking teeth; and an audio circuit comprising a microprocessor, and a speaker device in electrical connection with the microprocessor, wherein an operation of the zipper pull closes a circuit between the first and second electrical connections and provides signals to the microprocessor, whereby the microprocessor causes the microprocessor to plan an audio track through the speaker device.

A zipper system that produces a non-native audio signal, comprises a zipper mechanism, comprising: first teeth, second teeth capable of interlocking with the first teeth, and a zipper pull coupled to the first and second teeth, wherein a first operation of the zipper pull interlocks the first and second teeth and a second operation of the zipper pull separates the first and second teeth; and an audio playback system in circuit communication with the first and second teeth, wherein the first operation activates playback of the non-native audio signal.

DESCRIPTION OF THE DRAWINGS

The detailed description refers to the following figures in which like numerals refer to like items, and in which.

DETAILED DESCRIPTION

Zippers are well-known mechanisms for closing various articles including clothing, hand bags, luggage, sporting and camping gear, and many other articles. The major structure of a typical zipper consists of two rows of protruding teeth, which may be made to interdigitate, linking the rows. Each row may carry from tens to hundreds of specially shaped metal or plastic teeth. These teeth can be either individual or shaped from a continuous coil, and are also referred to as elements. A hand-operated slider moves along the rows of teeth. Inside the slider, a Y-shaped channel meshes together or separates the opposing rows of teeth, depending on the slider's direction of movement. The word zipper is onomatopoetic, because it was named for the sound the device makes when used, a high-pitched zip. That is, current zippers produce a sound that results from the meshing or separating of the zipper teeth. Thus, any sound produced by the zipper is a function of the teeth design and construction. Hereafter, this sound will be referred to as a natively-produced sound. Furthermore, once a current zipper is made, any sound natively-produced by that zipper is fixed, and cannot be changed or programmed.

In contrast to existing zippers, the herein disclosed embodiments of a zipper with separate sound producing system produce a sound that may occur during operation of the zipper pull, but the sound production does not occur due to the meshing or separating of the zipper teeth. Furthermore, the produced sound may be changed or programmed by a company that incorporates the zipper into its articles. Still further, in some embodiments, the end user may be able to change the sound produced by the zipper using programming provided by the company.

Figure 2:
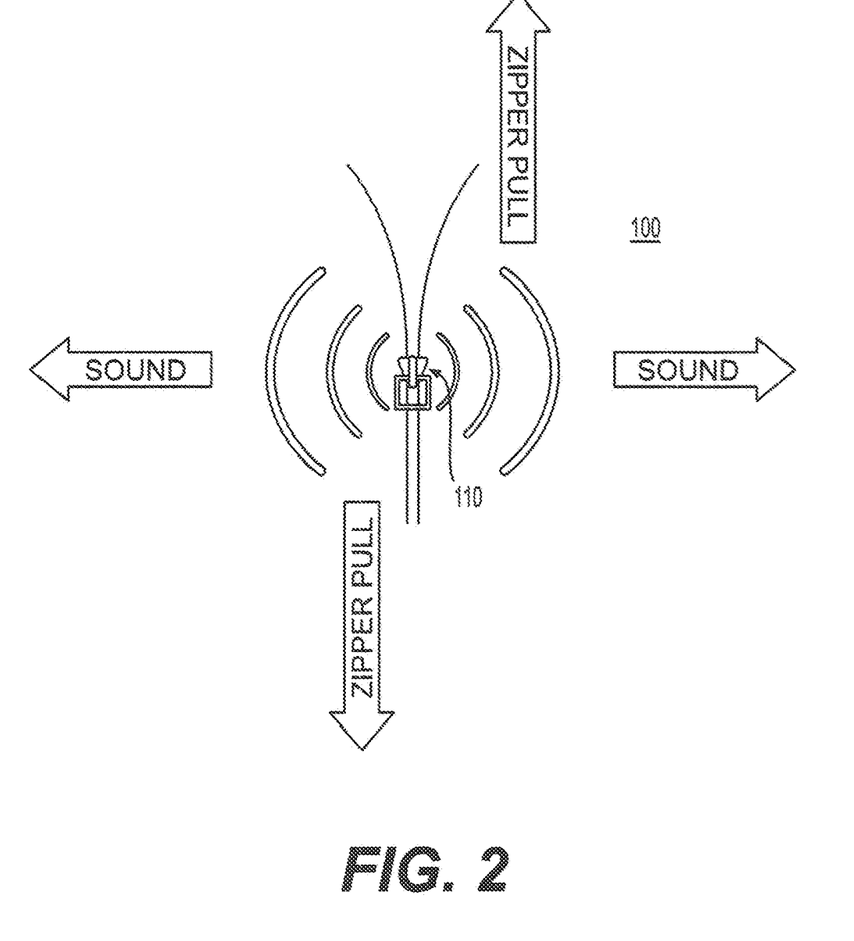
FIG. 2 illustrates a simplified schematic of a zipper system that incorporates a separate sound-producing system.

FIG. 2 illustrates a simplified schematic of a zipper that incorporates a separate sound-producing system. In FIG. 2, zipper 100 is shown with a pull 110 that operates to mesh or separate zipper teeth. The meshing and/or separating of the zipper teeth sends a signal to a separate sound-producing system (not shown in FIG. 2) that operates to produce sound.

Figure 3:
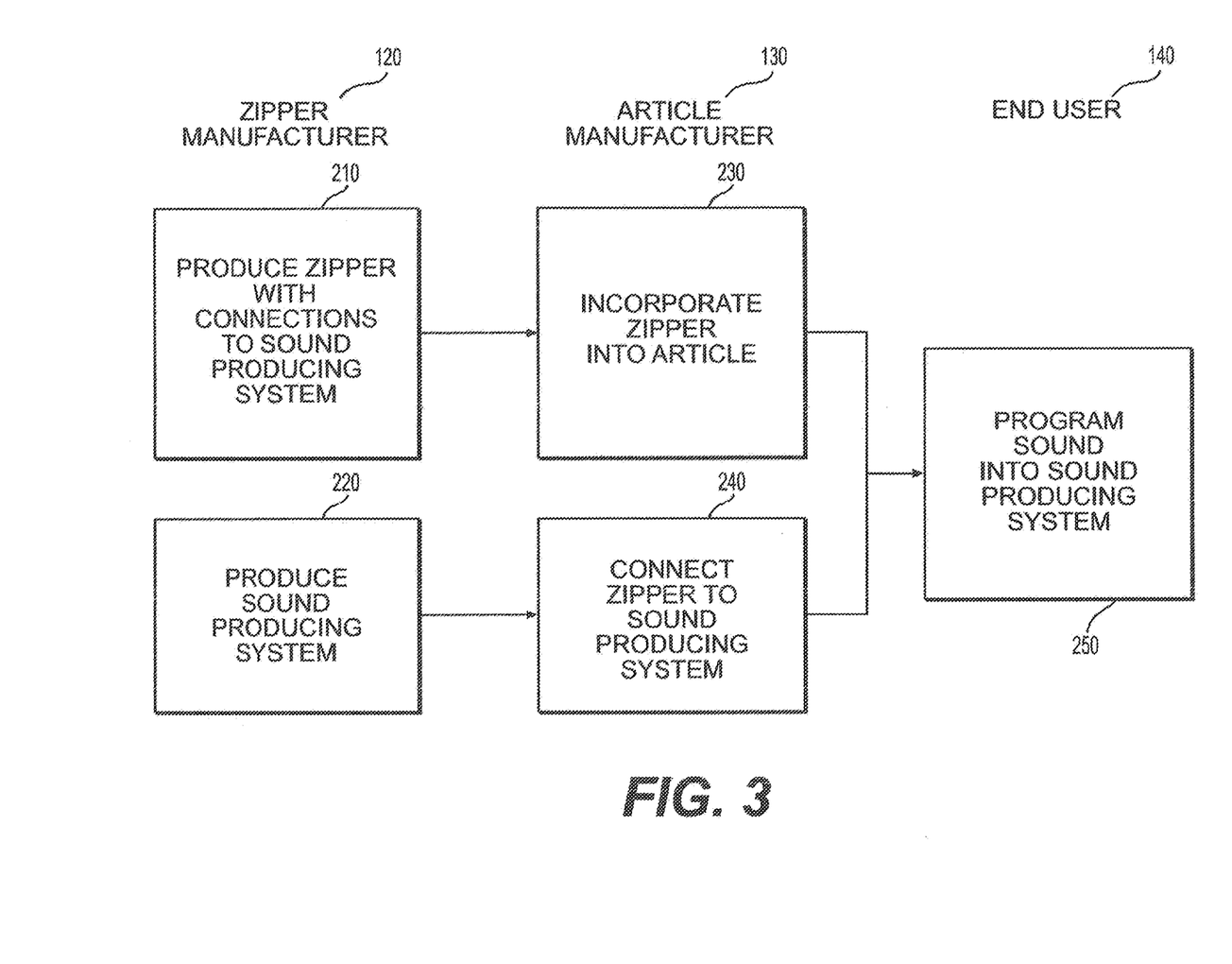
FIG. 3 illustrates a method for making a zipper system with a separate sound producing system, incorporating the zipper system into an article, and operating the zipper system by an end user to produce a desired sound.

FIG. 3 illustrates an example method for making a zipper with a separate sound producing system, incorporating the zipper into an article, and operating the zipper by an end user to produce a desired sound. In FIG. 3, a zipper manufacturer 120 manufactures (block 210) a zipper (e.g., the zipper 100) with connections to a separate sound producing system. The manufacturer 120 also produces (block 220) a separate sound producing system that may be connected to the zipper 100 connections. An article manufacturer incorporates the zipper 100 (block 230) into an article of manufacture, such as a clothing article. The article manufacturer also incorporates the separate sound system into the article of manufacture, and connects the separate sound system to the zipper 100. Finally, an end user acquires the article of manufacture, where provided and appropriate, programs the separate sound system, and then operates the zipper 100, thereby producing a sound track separate from the sound natively produced by the zipper 100.

Figure 4A:
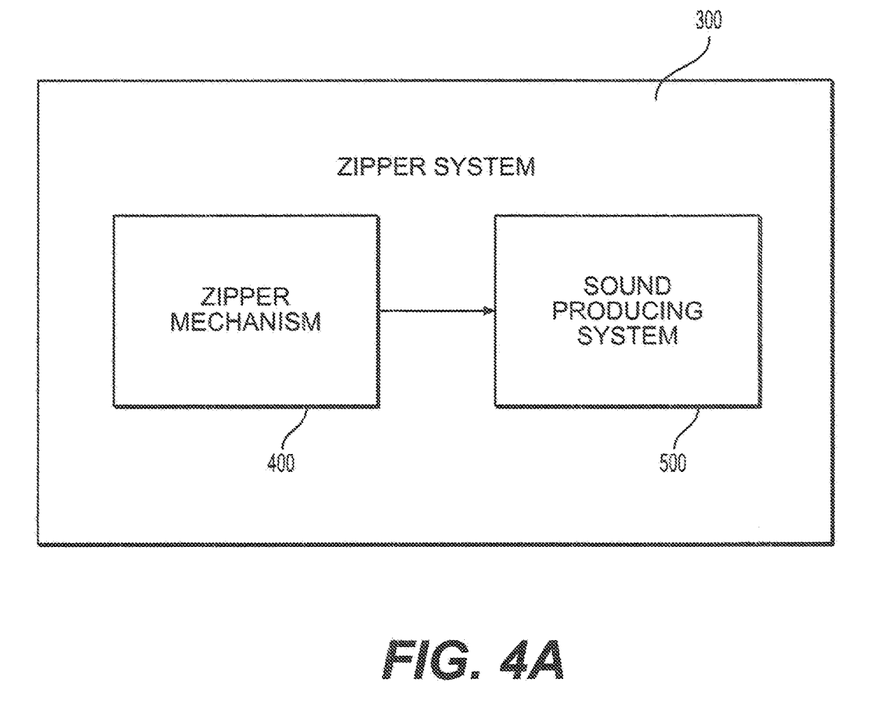
FIGS. 4A and 4B illustrate an example zipper system showing mechanisms for transforming zipper operations into specific zipper sounds.
Figure 4B:
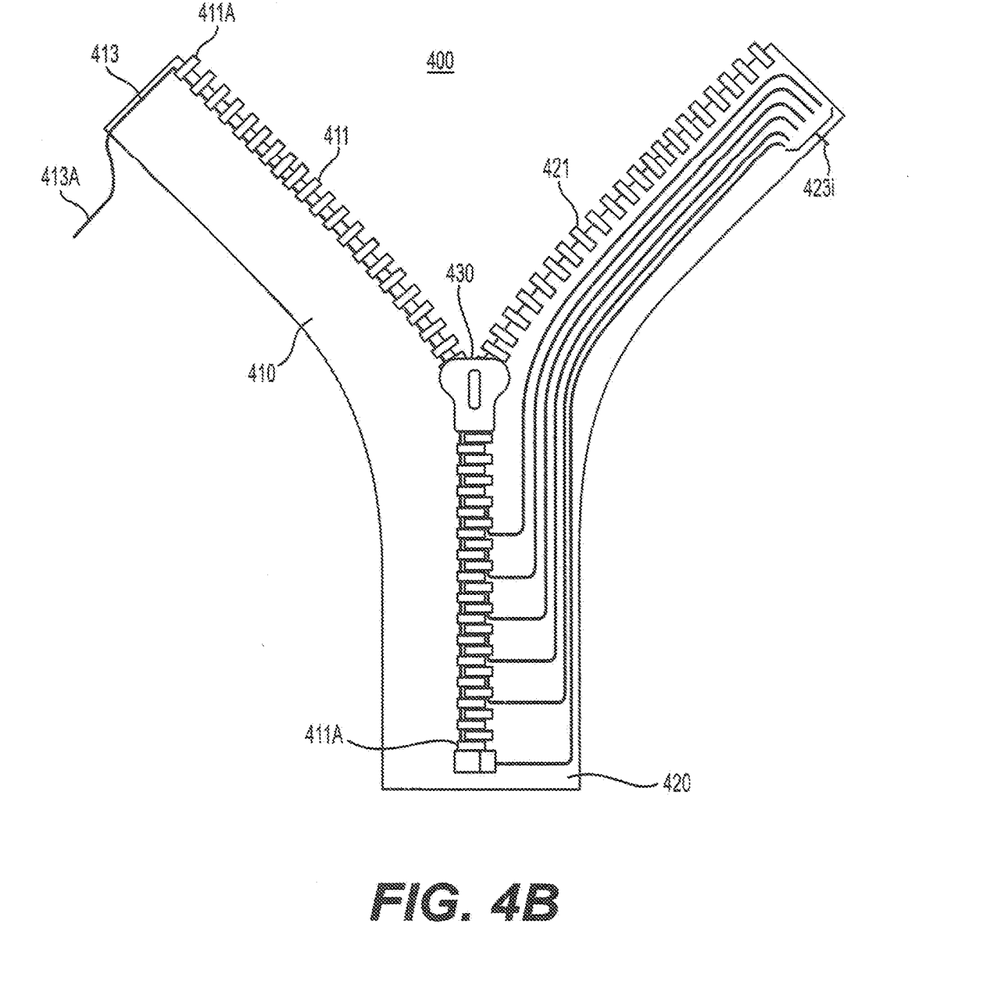

FIGS. 4A and 4B illustrate embodiments of a zipper system showing mechanisms for transforming zipper operation into specific zipper sounds separate from the natively-produced sounds. In FIG. 4A, zipper system 300 includes zipper mechanism 400, which is electrically coupled to separate sound producing system 500.

FIG. 4B illustrates components of an embodiment of a zipper with separate sound producing systems. In FIG. 4B, zipper mechanism 400 is illustrated from its inside surface—that is, the surface that would be seen from the inside of the article of manufacture to which the zipper mechanism 400 is attached. In FIG. 4B, zipper mechanism 400 includes flexible tapes 410 and 420. The tapes 410 and 420 may be formed from a material that is the same as, similar to, or compatible with the material of the article of manufacture into which the zipper system 300 will be incorporated. Tape 420 supports teeth 411, which are capable of meshing with teeth 421, which are supported by tape 420. Pull 430 is operated to cause the teeth 411 and 421 to mesh or separate. To produce a separate sound, different from the native sound the zipper mechanism 400 might make, tape 410 incorporates flexible, conductive thread 413, which connects to each of the teeth 411. Conductive thread 413 connects at top end (after passing tooth 311A) to connection point 413A, which may be used to connect to the separate sound system circuit (see, for example, FIG. 5A). The conductive thread 413 terminates at a bottom end with tooth 411A. However, the conductive thread 413 may terminate at its top end and/or its bottom end at other teeth, rather than the teeth 411A and 411B, respectively. The tape 420 supports multiple flexible, conductive threads $423_i$. The exact number of threads $423_i$ may be chosen based on an expected sound track that may be produced by the attached sound system circuit. In an embodiment, each tooth 421 connects to a separate conductive thread $423_i$. Alternately, a limited number of teeth 421 each connect to a separate conductive thread $423_i$.

In FIG. 4B, the zipper mechanism 400 is shown with flexible, conductive threads 413 and $423_i$. However, the zipper system 400 may, in an alternate embodiment, employ flexible conductive tape, wires, paint, or any other suitable flexible and conductive mechanism. Furthermore, the flexible, conductive threads 413 and $423_i$ may be covered with a suitable flexible material (not shown) to protect the threads from damage.

As is disclosed herein, when teeth 411 mesh with a tooth 421 to which is attached a thread $423_i$, a signal is sent to the sound system circuit. In an embodiment, when the same teeth separate, another signal may be sent to the sound system circuit.

As is disclosed herein, when teeth 411 mesh with certain teeth 421, a signal is sent to the sound system circuit. In an embodiment, when the same teeth separate, another signal may be sent to the sound system circuit.

In an aspect, when the teeth of the embodiment of FIGS. 4A and 4B mesh (and/or separate), the signal sent to the sound circuit system may provide position information to the sound circuit system.

Figure 5A:
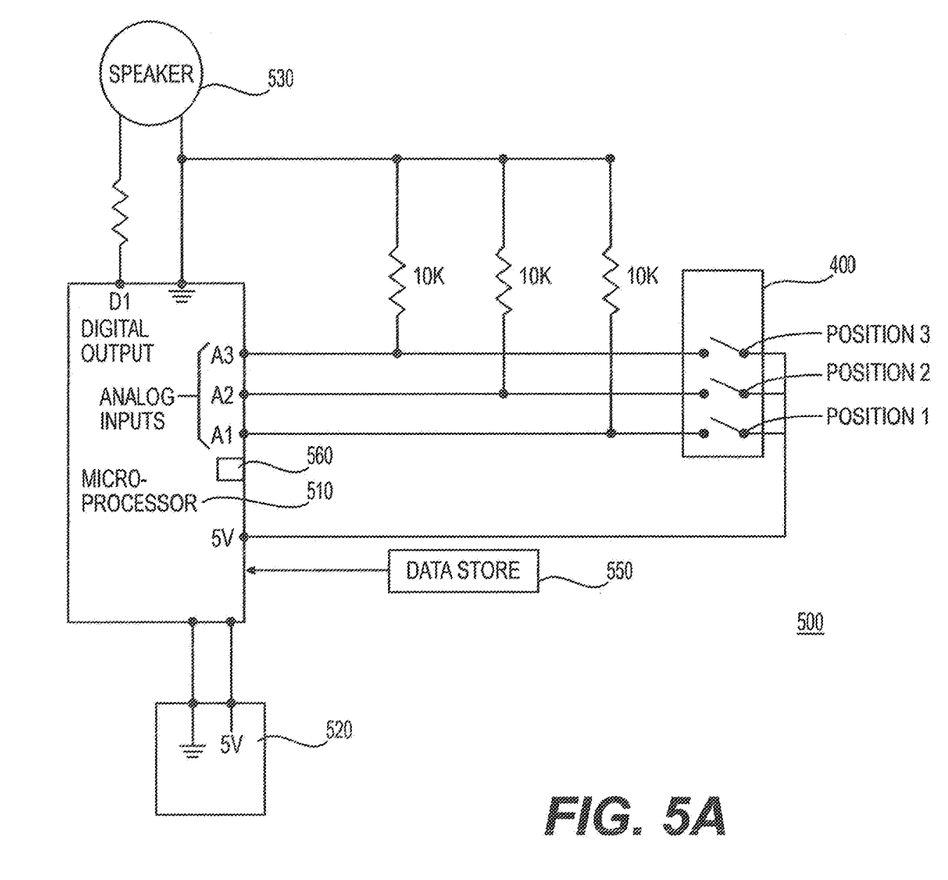
FIG. 5A is an electrical schematic of components of a separate sound circuit system of the zipper system of FIGS. 4A and 4B.

FIG. 5A is an electrical schematic of components of a separate sound circuit system for producing non-native sounds in response to operation of a zipper pull. In FIG. 5A, sound circuit system 500 includes microprocessor 510, which receives analog inputs A1, A2, A3 corresponding to specified positions 1, 2, 3 of the meshed teeth of the zipper (e.g., zipper system 300 and zipper mechanism 400 of FIGS. 4A and 4B, respectively). The microprocessor 510 is powered by low-voltage power source 520. The power source 520 may be a long-lasting battery, a rechargeable battery, or a replaceable battery, and may provide a voltage of 5 volts. The microprocessor 510 provides a digital output to speaker 530 or other piezoelectric devices. The sound circuit system 500 may include various resistors, as illustrated, and other circuit components.

In an embodiment, the microprocessor 510 is programmed to play a specific tune or audio track when the zipper pull is operated. The microprocessor 510 may be programmed to play one audio track when the zipper closes (teeth mesh) and another audio track when the zipper opens (teeth separate). The microprocessor 510 may be programmed in hardware, firmware, or software, or any combination thereof.

In an embodiment, the sound circuit system includes on/off switch 540, which may be used to disable playback of an audio track. In an embodiment, the sound circuit system may include a data store 550 that stores user-selectable audio tracks that may play during operation of the zipper mechanism 400 (FIG. 4S). In an aspect, the data store 550 may be incorporated with the microprocessor 510. In an aspect, the data store 550 may include a selection of use audio tracks. In another aspect, the system 500 includes an API that allows an end user to upload audio tracks for storage in the data store 550 and subsequent selection for playback by the end user. To facilitate upload of specific audio tracks to the data store 550, the system 500 may include a connection 560 to an external device from which the audio tracks are acquired by the system 500. The connection 560 may be a physical (e.g., wired) connection or a wireless connection. The connection 560 may allow two-way communication with the external device; such two-way connection may allow an end user to view the content of the data store 550, and to edit the content of the data store 550. In an embodiment, the system 500 communicates through connection 580 with a smartphone using Bluetooth protocols. In other embodiments, the system 500 may communicate with an external device using WiFi or other wireless protocols.

Figure 5B:
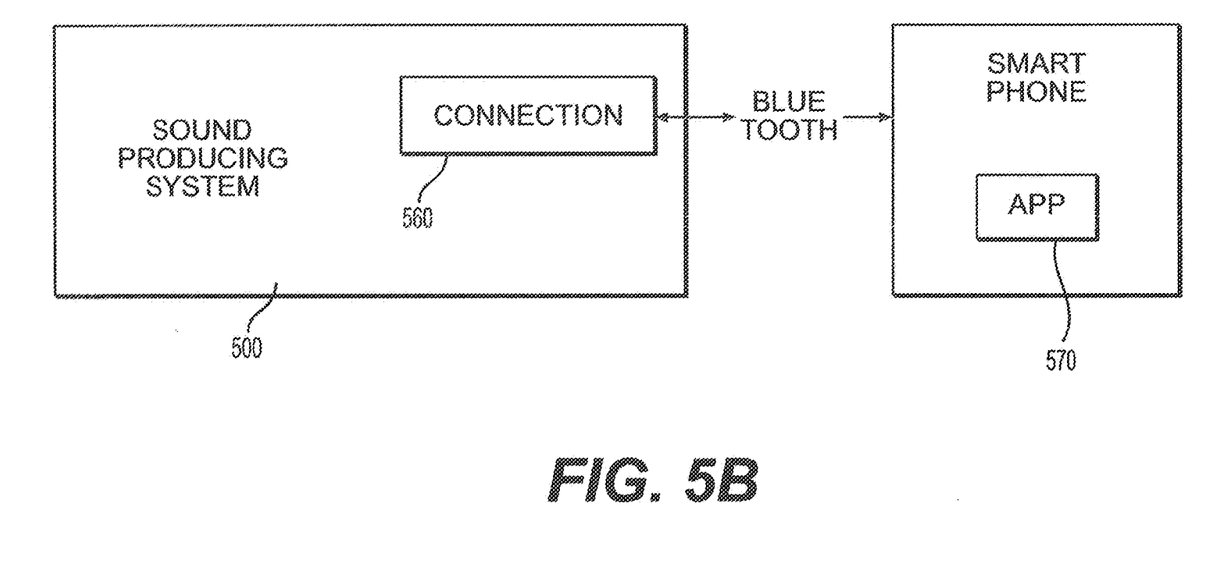
FIG. 5B illustrates additional aspects of the sound circuit system of FIG. 5A.

In another embodiment, the microprocessor 510 may be programed by the end user to play an end user-desired audio track. FIG. 5B illustrates an example arrangement in which system 500, through connection 560, uses Bluetooth protocols to communicate with a smartphone. The smartphone may have installed thereon a specific application (App) 570 to control the system 500, and hence the audio tracks played during opening and/or closing of zipper mechanism 400. Using the App 570, an end user can silence the system 500, turn the system 500 on and off, add and delete audio tracks, edit audio tracks, and control the order of playing the audio tracks. For example, the end user may use the App 570 to shuffle the order of playing two or more audio tracks.

The zipper system 300 may, as disclosed herein, be used to play an audio track when the zipper is opened, and another audio track when the zipper is closed. In some embodiments, the audio track may be programmed and by an end user. The audio track may be any audio recording, including a segment from a song or a musical track, a recording of human speech, an animal sound, or any mechanical sound. In an aspect, the audio track may take the form of an alarm that sounds when the zipper is opened. For example, a handbag zipper may cause an alarm to sound when a person other than the handbag's owner attempts to open the handbag by operating the zipper.

In an alternate embodiment, the microprocessor 510 operates under control of the App 570 to produce a sound on the connected external device such as the smart phone of FIG. 5B. Alternately, the App 570 may produce a text message displayed on the smart phone. In another embodiment, the App 570 may configure the microprocessor 510 to send a text message or other signal to the attached external device indicating the associated zipper mechanism is being operated (e.g., being opened (by an unauthorized person)).

Figure 6A:
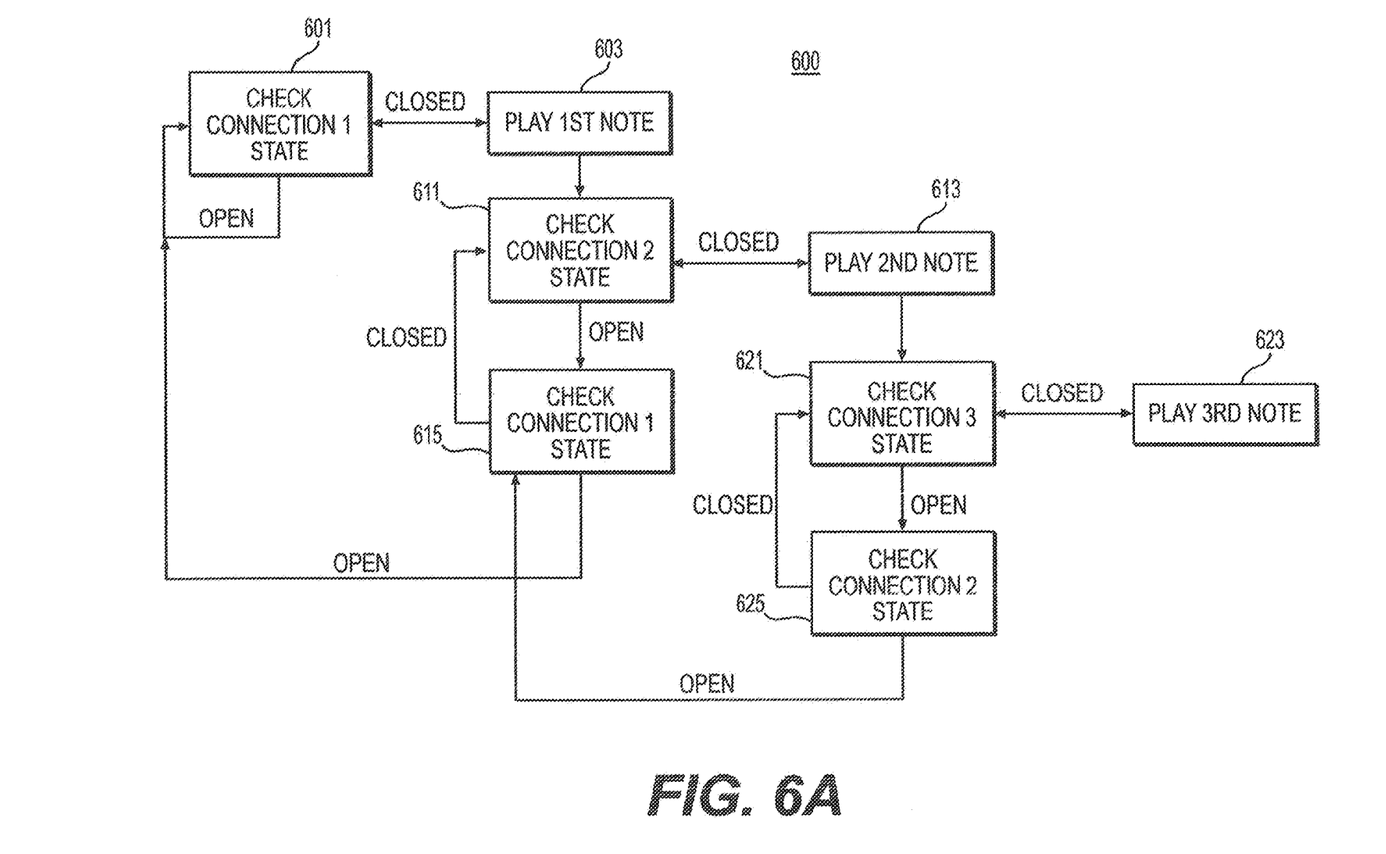
FIGS. 6A-6B are flowcharts illustrating example operations of the systems of FIGS. 5A and 5B.
Figure 6B:
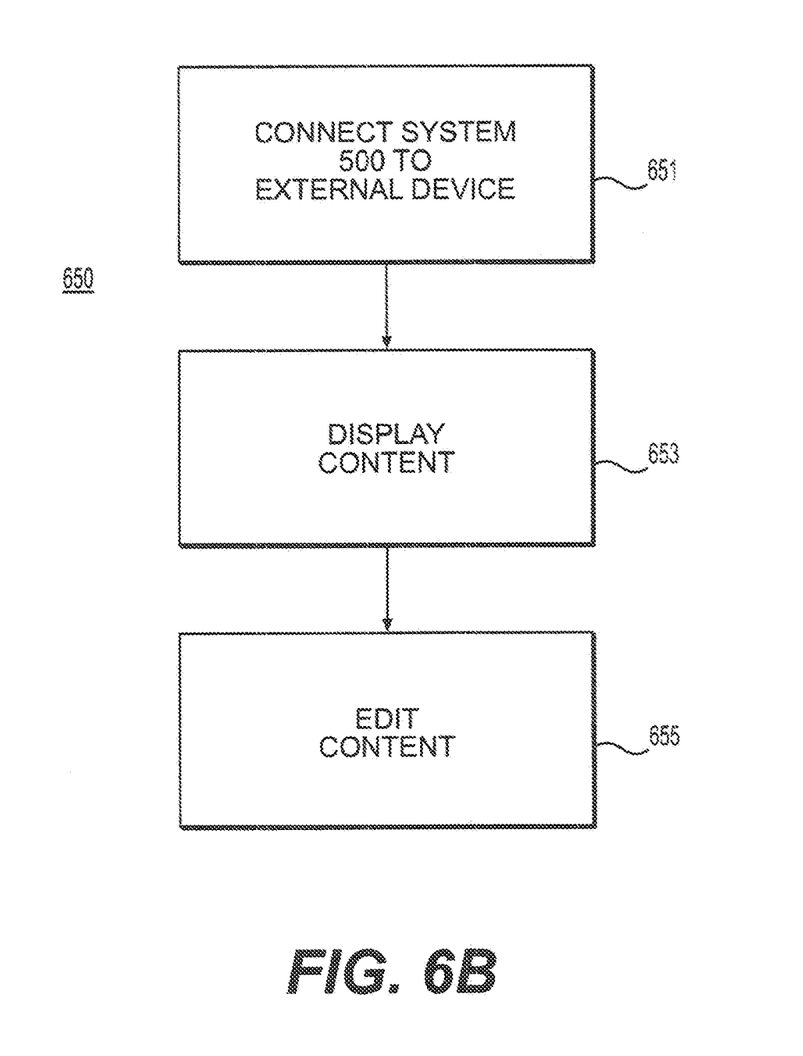

FIGS. 6A-6B are flowcharts illustrating example operations of the systems of FIGS. 5A and 5B. Referring to FIG. 6A, an operation is shown for a zipper with a separate sound producing system is shown with three switches that open and close to play three notes of a tune or audio track. However, other zippers may be programmed to play more than three notes or fewer than three notes, and FIG. 6A is for illustrative purposes. In FIG. 6A, operation 600 begins in block 601 when the microprocessor 510 checks the state (position) of switch (connection) 1. In block 601, if the state of connection 1 is open, the operation 600 returns to block 601. If the state of connection 1 is closed, the microprocessor 510 operates to cause note 1 of tune 1 to play (block 603). Note 1 may play for a specified time, and until the entire note plays. The operation 600 then moves to block 611 and the microprocessor 510 checks the state of connection 2. If in block 611, connection 2 is closed, the microprocessor 510 causes note 2 to play. However, if in block 611, the microprocessor 510 determines that connection 2 is open, operation 600 moves to block 615 and the microprocessor 510 determines the state of connection 1. In block 615, if the state of connection 1 is closed, the operation 600 returns to block 611. In block 615, if the state of connection 1 is open, the operation 600 returns to block 601. Following playing note 2, the operation 600 moves to block 621, and the microprocessor 510 checks the state of connection 3. If connection 3 is open, the operation 600 moves to block 625, and the operation 600 checks the state of connection 2. In block 625, if the state of connection 2 is open, the operation 600 returns to block 615. In block 625, if the state of connection 2 is closed, the operation 600 moves to block 621. In block 621, if the state of connection 3 is closed, the microprocessor 510 causes note 3 to play. Following block 623, operation 600 ends.

In an embodiment, reversing the operation of the zipper (i.e., the connections 1-3 move from closed to open), that microprocessor 510 may operate to play three notes of a separate tune (i.e., tune 2).

FIG. 6B illustrates operation 650, in which an end user connects, block 651, the system 500 to an external device. The system 500 cooperates with the external device to display, block 653, content stored on the data store 550. The end user then may operate the external device in cooperation with the system 500, and the system 500 updates or edits the content on the data store 550.

In an alternate embodiment, the microprocessor 510 operates under control of the App 570 to produce a sound on the connected external device such as the smart phone of FIG. 5B. Alternately, the App 570 may produce a text message displayed on the smart phone. In another embodiment, the App 570 may configure the microprocessor 510 to send a text message or other signal to the attached external device indicating the associated zipper mechanism is being operated (e.g., being opened (by an unauthorized person)).

Figure 7:
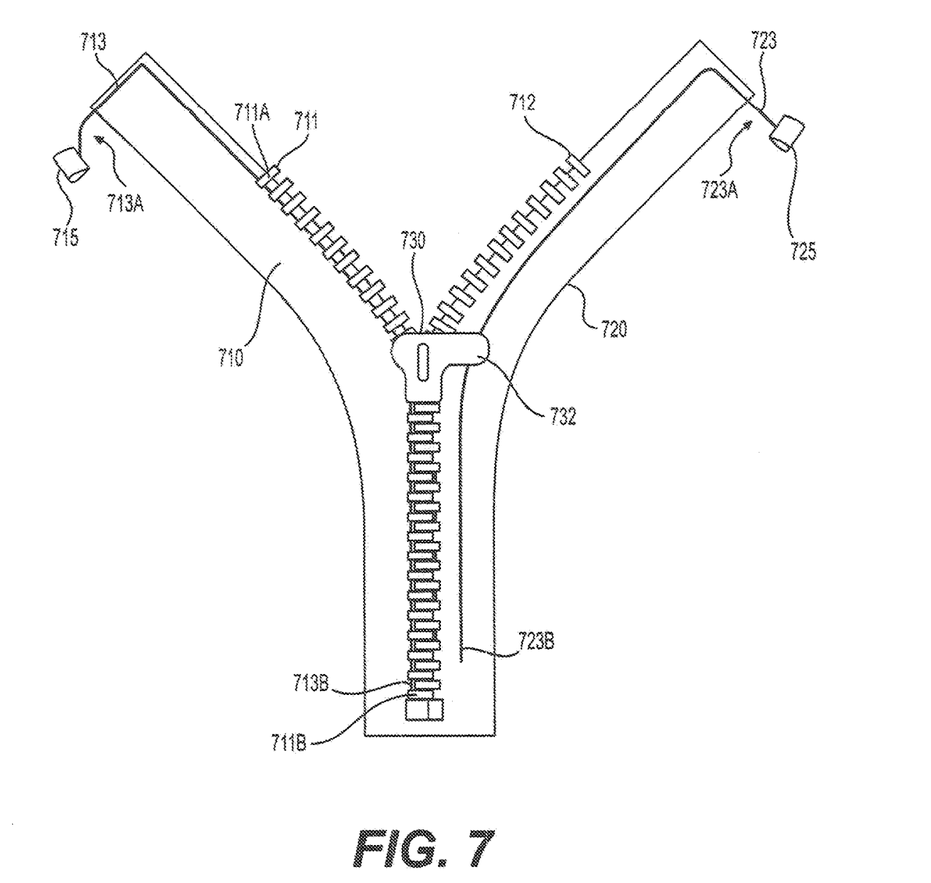
FIG. 7 illustrates an alternate zipper system.

FIG. 7 illustrates another embodiment of a zipper mechanism with a separate sound producing systems. In FIG. 7, zipper mechanism 700 includes flexible tape 710, which supports teeth 711, and flexible tape 720, which supports teeth 712. The tapes 710 and 720 may be formed from a material that is the same as, similar to, or compatible with the material of the article of manufacture into which the zipper mechanism 700 will be incorporated. The teeth 711 and 712 are made to mesh and separate by operation of pull 730. To produce a separate sound, different from the native sound the zipper mechanism 700 might make, tape 710 incorporates flexible, conductive thread 713, which connects to each of the teeth 711. Conductive thread 713 connects at top end 713A (after passing tooth 711A) to connection point 715, which may be used to connect to a sound system circuit. The conductive thread 713 terminates at a bottom end 713B with tooth 711B. However, the conductive thread 713 may terminate at its top end and/or its bottom end at other teeth, rather than the teeth 711A and 711B, respectively. The tape 720 is shown to support a single flexible, conductive thread 723. The conductive thread 723 can be seen to be electrically isolated from the teeth 712. The conductive thread 723 includes a top end 723A that terminates with connection point 725 and ends at a bottom end 723B. Zipper pull 730 operates to mesh or separate the teeth 711 and 712. In an embodiment, the flexible conductive threads 713 and 723 may be replaced with other flexible, conductive mechanisms. The zipper pull 730 includes extension 732 that is in electrical contact with conductive thread 723. As is disclosed herein, when teeth 711 mesh with certain teeth 712, a signal is sent to the sound system circuit. In an embodiment, when the same teeth separate, another signal may be sent to the sound system circuit. The signal sent to the sound system circuit is a function of resistance in the conductive thread 723. The resistance is, in effect, variable because as the zipper pull 730 moves, for example, from an open to closed position, the conductive thread 723 "shortens" from a resistive perspective. The attached sound circuit system uses the variable resistance to control playback of audio tracks in response to operation of the zipper pull 730. For example, a microprocessor similar to microprocessor 510 of FIG. 5A may be programmed to play different notes or sound tracks when the measured resistance of conductive thread 723 changes (increases or decreases due to opening or closing, respectively) by a defined amount or reaches specific values.

Figure 8:
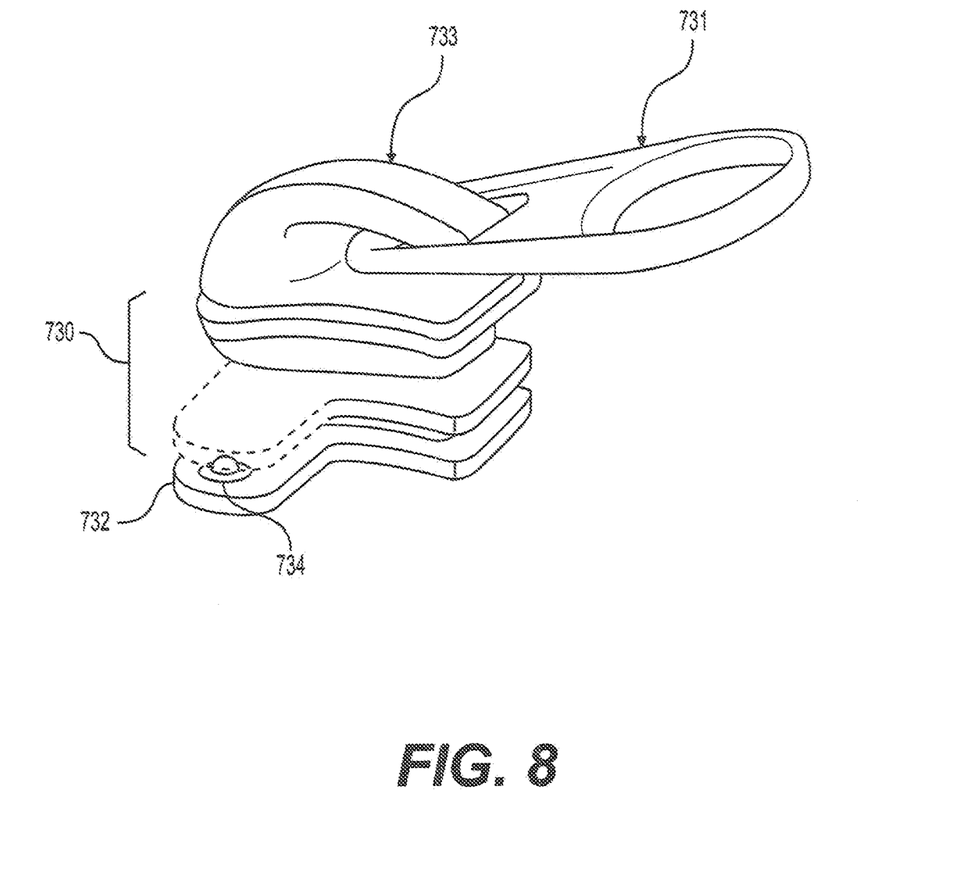
FIG. 8 illustrates an example zipper gull used with the zipper system of FIG. 7.

FIG. 8 illustrates an example of zipper pull 730 used with the zipper mechanism of FIG. 7. As can be seen in FIG. 8, zipper pull 730 includes handle 731, crown 733, and the extension 732, which rides on the outside and the inside (or top and bottom) of flexible tape 720 (see FIG. 7). The extension 732 houses a ball and detent mechanism 734, which operates to bias an inner conductive surface of the extension 732 against the flexible, conductive thread 723 to provide a good electrical contact between the zipper pull 730 and the flexible conductive thread 723.

The preceding disclosure refers to flowcharts and accompanying descriptions to illustrate the embodiments represented in FIGS. 6A-6B. The disclosed devices, components, and systems contemplate using or implementing any suitable technique for performing the steps illustrated. Thus, FIGS. 6A-6B are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and theft equivalents. Some embodiments can be implemented as one or more computer programs; i.e., one or more modules of computer program instructions, encoded on a non-transitory computer storage medium for execution by one or more processors or microprocessors. A computer storage medium can be, or can be included in, a computer-readable storage device, a computer-readable storage substrate, or a random or serial access memory. The computer storage medium can also be, or can be included in, one or more separate physical components or media such as multiple CDs, disks or other storage devices.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A zipper system, comprising:
 a zipper mechanism comprising;
  a first flexible flap, comprising:
   first interlocking teeth; and
   a first conductive thread coupled to two or more of the first interlocking teeth;
  a second flexible flap, comprising:
   second interlocking teeth; and
   a plurality of second conductive threads, each electrically coupled to a respective one of the second interlocking teeth,
  a zipper pull that operates in a first direction to cause the first and second interlocking teeth to mesh and operates in a second direction to cause interlocked first and second interlocking teeth to separate; and
 an audio playback circuit, comprising:
  a switching circuit coupled to each of the plurality of second conductive threads and the first conductive thread, the switching circuit comprising a plurality of switches, each of the plurality of switches solely coupled to one of the plurality of second conductive threads and coupled to the first conductive thread, each of the plurality of switches closed by a mesh of its coupled respective second interlocking teeth and a corresponding first interlocking tooth;
  a microprocessor coupled to the switching circuit and receiving analog signals from the switching circuit,
  an audio track storage;
  control instructions executed by the microprocessor to cause playback of an audio track from the audio track storage, and
  a speaker device coupled to the microprocessor that broadcasts the audio track.

2. The zipper system of claim 1, wherein the audio playback circuit further comprises a low voltage power supply coupled to the microprocessor.

3. The zipper system of claim 1, wherein the audio playback circuit further comprises an external connection device connecting the microprocessor to an external control device, wherein the microprocessor receives instructions to control playback of the audio track.

4. The zipper system of claim 3, wherein the external connection comprises a Bluetooth connection.

5. The zipper system of claim 1, where meshing of a first interlocking tooth and a second interlocking tooth causes a first switch to close, the first switch closing causing the microprocessor to execute playback of a first note of the audio track.

6. The zipper system of claim 1, wherein the audio track is an alarm.

7. The zipper system of claim 1, wherein the audio track is end user-selectable.

8. A zipper system, comprising:
 a zipper body, comprising:
  a first tape, comprising:
   first interlocking teeth; and
   a first flexible wire in electrical contact with two or more of the first teeth, the first flexible wire having disposed at a top end, a first electrical connection,
  a second tape, comprising:
   second interlocking teeth; and
   a plurality of second flexible wires, each of the plurality of second flexible wires in electrical contact with only one of the second interlocking teeth, and
  a zipper pull in contact with the first and second interlocking teeth, wherein a first operation of the zipper pull meshes the first and second interlocking teeth and a second operation of the zipper pull separates the first and second interlocking teeth; and an audio circuit comprising:
  a switch circuit comprising a plurality of individual switches, each switch electrically coupled to an individual one of the plurality of second flexible wires,
  a microprocessor, and
  a speaker device in electrical connection with the microprocessor, wherein an operation of the zipper pull closes a circuit between the first electrical connection and the second flexible wires, and provides signals to the microprocessor, and the microprocessor causes playback of an audio track through the speaker device.

9. The zipper system of claim 8, wherein the microprocessor comprises a connection to an external device, and wherein the microprocessor receives control signals over the connection, the control signals directing an operation of the microprocessor.

10. The zipper system of claim 9, wherein the connection is a Bluetooth connection.

11. The zipper system of claim 10, wherein the microprocessor receives a control signal to disable the audio track playback.

12. The zipper system of claim 10, wherein the microprocessor receives a control signal to enable playback of the audio track.

13. A zipper system that produces a non-native audio signal, comprising:
  a zipper mechanism, comprising:
    first teeth,
    second teeth capable of interlocking with the first teeth, and
    a zipper pull coupled to the first and second teeth, wherein a first operation of the zipper pull interlocks the first and second teeth and a second operation of the zipper pull separates the first and second teeth,
  a ground wire coupling each of the first teeth to a switch circuit comprising a plurality of electrical switches, and
  a plurality of position wires, each position wire coupled to individual ones of the second teeth and to corresponding individual switches in the switch circuit, wherein meshing of a first tooth with a second tooth coupled to a position wire causes a switch in the switch circuit to close; and
  an audio playback system in circuit communication with the switch circuit and the first operation activates playback of the non-native audio signal.

14. The zipper system of claim 13, wherein the non-native audio signal comprises a first audio track.

15. The zipper system of claim 13, wherein the second operation activates playback of another non-native audio signal comprising a second audio track.

16. The zipper system of claim 13, wherein the audio playback circuit, comprises:
  a microprocessor coupled to the switch circuit; and
  a speaker coupled to the microprocessor, wherein when the switch in the switch circuit closes, the microprocessor executes instructions to play the non-native audio signal.

17. The zipper system of claim 16, wherein the audio playback circuit further comprises:
  a configurable data store; and
  an external connection coupled to the microprocessor, wherein:
    the external connection couples the microprocessor to an external control device, and
    the microprocessor, under control of the external control device, stores a plurality of non-native audio signals in the data store.

18. The zipper system of claim 17, wherein the external connection of the audio playback circuit provides a control signal to the external control device, the control signal causing the external device to broadcast a message.

19. The zipper system of claim 18, wherein the message is one of a text message and an audio message broadcast by the external control device.

20. A zipper system, comprising:
  an audio playback system comprising an electrical circuit, the electrical circuit comprising a plurality of individual switches; and
  a zipper mechanism coupled to the electrical circuit, comprising:
    left interlocking teeth and right interlocking teeth,
    a zipper pull that operates in a close direction to mesh the left and right interlocking teeth and operates in an open direction to separate the left and right interlocking teeth,
    a ground wire coupling each of the left interlocking teeth to the all of the plurality of individual switches in the electrical circuit, and
    a plurality of position wires, each position wire solely electrically coupled to individual ones of the right interlocking teeth and to corresponding individual switches in the electrical circuit, and operation of the zipper pull causes the individual switches in the electrical circuit to close to signal the audio playback system to play an audio track.

21. The zipper system of claim 20, wherein the audio playback system comprises:
  a programmable microprocessor and an input, wherein the input provides a program signal to the microprocessor to change the audio track played by the audio playback system; and
  a speaker, wherein the audio track is played over the speaker.

22. The zipper system of claim 21, wherein the input comprises a Bluetooth receiver, and wherein the Bluetooth receiver receives the program signal from a device external to the zipper system.

23. The zipper system of claim 20, wherein the zipper system in incorporated into an article of manufacture.

24. The zipper system of claim 20, wherein the audio track is an alarm.

25. The zipper system of claim 20, wherein a first audio track plays when the zipper pull moves in the close direction and a second audio track plays when the zipper pull moves in the open direction.

* * * * *